United States Patent
Becker et al.

(10) Patent No.: US 8,336,624 B2
(45) Date of Patent: *Dec. 25, 2012

(54) SQUEEZE PROCESS FOR REACTIVATION OF WELL TREATMENT FLUIDS CONTAINING A WATER-INSOLUBLE ADSORBENT

(75) Inventors: Harold L. Becker, Tomball, TX (US); D. V. Satyanaryana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/731,298

(22) Filed: Mar. 25, 2010

(65) Prior Publication Data

US 2010/0175875 A1 Jul. 15, 2010

Related U.S. Application Data

(63) Continuation-in-part of application No. 12/261,982, filed on Oct. 30, 2008, now Pat. No. 7,686,081.

(51) Int. Cl.
*E21B 37/06* (2006.01)
*E21B 43/04* (2006.01)
*E21B 43/25* (2006.01)
*E21B 43/26* (2006.01)

(52) U.S. Cl. ..... 166/278; 166/279; 166/304; 166/308.3; 166/310

(58) Field of Classification Search .................. 166/278, 166/279, 280.1, 280.2, 304, 305.1, 308.2, 166/308.3, 310, 371; 507/260, 269
See application file for complete search history.

(56) References Cited

U.S. PATENT DOCUMENTS

| 3,850,248 | A | 11/1974 | Carney |
| 4,048,079 | A | 9/1977 | Clampitt et al. |
| 4,470,915 | A | 9/1984 | Conway |
| 5,102,558 | A | 4/1992 | McDougall et al. |
| 5,370,184 | A | 12/1994 | McDougall et al. |
| 6,599,863 | B1 | 7/2003 | Palmer et al. |
| 7,252,986 | B2 | 8/2007 | Davis-Hoover et al. |
| 7,491,682 | B2 | 2/2009 | Gupta et al. |
| 7,493,955 | B2 | 2/2009 | Gupta et al. |
| 7,494,711 | B2 | 2/2009 | Kaufman et al. |
| 7,686,081 | B1 * | 3/2010 | Becker .......................... 166/279 |
| 2004/0023816 | A1 | 2/2004 | Burts, III |
| 2006/0124301 | A1 * | 6/2006 | Gupta et al. .................. 166/279 |
| 2006/0124302 | A1 * | 6/2006 | Gupta et al. .................. 166/279 |
| 2007/0173417 | A1 | 7/2007 | Kaufman et al. |

FOREIGN PATENT DOCUMENTS

WO WO 2008/028074 A2 3/2006

* cited by examiner

*Primary Examiner* — George Suchfield
(74) *Attorney, Agent, or Firm* — R. Andrew Patty, II; McGlinchey Stafford PLLC

(57) ABSTRACT

A process for fracturing a subterranean formation in the production of an oil well is described. The process steps include injecting an initial charge of a mixture, the mixture being formed from at least a water-insoluble adsorbent and at least one well treatment agent, into a well bore formed in the subterranean formation so as to form a downhole matrix within the formation; injecting a solution comprised of an additional amount of the well treatment agent into the formation after the initial charge of the at least one well treatment agent has been substantially depleted; and then pressurizing the well bore for a time and under conditions sufficient to reactivate the downhole matrix in the formation, so that the treatment agent activity of the matrix is increased relative to the treatment agent activity of the matrix just prior to injecting the solution.

20 Claims, No Drawings

SQUEEZE PROCESS FOR REACTIVATION OF WELL TREATMENT FLUIDS CONTAINING A WATER-INSOLUBLE ADSORBENT

REFERENCE TO RELATED APPLICATION

This application is a continuation-in-part of U.S. application Ser. No. 12/261,982, filed Oct. 30, 2008, now allowed, the disclosure of which is incorporated herein by reference.

TECHNICAL FIELD

This invention relates to methods for enhancing or facilitating oil field production processes using water-insoluble adsorbents.

BACKGROUND

Water-insoluble adsorbents are used in the fracturing of hydrocarbon wells in geological formations as proppant components in, e.g., well treatment fluids in which they provide a support matrix within the formation to keep the fracture open and facilitate the flow of well production fluids. One type of water-insoluble adsorbent is activated diatomaceous earth, which is also known as DE, TSS, diatomite, diahydro, kieselguhr, kieselgur or celite (hereinafter "DE").

Gravel packs are often used to control particulate migration in such producing formations. A gravel pack typically consists of a mass of particulates which are packed around the exterior of a screening device. In order to be useful in gravel packing applications, such particulates must exhibit high strength and be capable of functioning in high permeability formations.

Frac Packs are used in high permeability formations to stimulate high permeability formations where a combination of fracturing treatment is performed ending with packing of the fracture to the wellbore which eliminates the need for screens.

Gravel Pack Screens can also be packed with proppant.

Frequently, the water-insoluble adsorbent-containing fluids injected into the well also include chemical additives (e.g., scale, corrosion, asphaltene or paraffin inhibitors) which impart useful chemical properties to the production fluids coming out of the formation. However, over time, the efficacy of the additives in admixture with the water-insoluble adsorbent of the downhole fluid diminishes, or "plays out," causing production issues when the chemical attributes imparted by the well treatment additives are critical to efficient well production.

There exists, therefore, a significant and long-felt need for methods to increase the longevity of the chemical performance of water-insoluble adsorbent-containing well treatment fluids.

SUMMARY OF THE INVENTION

This invention provides a unique and highly efficient method for recharging deployed water-insoluble adsorbent-containing well treatment fluids with one or more additional, active treatment agents. The methods of this invention enable well fracture treatment to have a longer effective life, by enabling the existing matrix formed using water-insoluble adsorbents to be recharged with well treatment agents having beneficial chemical attributes for inhibition of various well production issues created by, e.g., paraffin accumulation, corrosion or asphaltene buildup.

Thus, one embodiment of this invention is a process for fracturing a subterranean formation in the production of an oil well, comprising injecting an initial charge of a mixture, the mixture being formed from at least a water-insoluble adsorbent and at least one well treatment agent, into a well bore formed in the subterranean formation so as to form a downhole matrix within the formation;

injecting a solution comprised of an additional amount of the well treatment agent into the formation after the initial charge of the at least one well treatment agent has been substantially depleted; and then pressurizing the well bore for a time and under conditions sufficient to reactivate the downhole matrix in the formation, so that the treatment agent activity of the matrix is increased relative to the treatment agent activity of the matrix just prior to injecting the solution.

Another embodiment of this invention is a process which further comprises pressurizing the well bore to a pressure below the fracturing pressure, and preferably to a pressure in the range of about 500 to about 15000 psia while remaining under the fracturing pressure of the formation.

Other embodiments of this invention are directed to gravel packing.

These and other features and embodiments of this invention will be still further apparent from the ensuing description and appended claims.

FURTHER DETAILED DESCRIPTION OF THE INVENTION

The mixture charged to the well bore in the practice of this invention is typically formed by bringing together a water-insoluble adsorbent and one or more of several possible well treatment agents. The well treatment agents may include, for example, one or more paraffin inhibitors, hydrate inhibitors, scale inhibitors, asphaltene inhibitors, or a mixture of any two or more of the foregoing. Suitable paraffin inhibitors include, for example, paraffin crystal modifiers, dispersant/crystal modifier combinations, and the like. Particular paraffin crystal modifiers may include, for example, ethylene vinyl acetate polymer (e.g., WAX CHECK 5384 available from BJ Services Company of Houston, Tex.), fatty alcohol esters of olefin maleic anhydride copolymers, acrylate polymers of fatty alcohol esters, and the like. Particular suitable dispersants may include, for example, dodecyl benzene sulfonate, oxyalkylated alkylphenols, oxyalkylated alkylphenolic resins and the like. Suitable hydrogen sulfide scavengers could include, for example, trihydroxyethyltriazine, and the like. Suitable hydrate inhibitors could include, for example, polyethoxy polyamine, and the like. Suitable scale inhibitors include, for example, triethanolamine phosphate esters, and the like. Suitable asphaltene inhibitors include, for example, sorbitan monooleate, polyisobutylene succinic anhydride, and the like.

The water-insoluble adsorbents employed in mixtures of this invention include activated carbon and/or coals, silica particulates, precipitated silica, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, finely divided minerals, fibers, ground almond shells, ground walnut shells, ground coconut shells, fuller's earth and organic synthetic high molecular weight water-insoluble adsorbents, natural clays, preferably those natural clays having a relatively large negatively charged surface and a much smaller surface that is positively charged, and such clays as bentonite, illite, montmorillonite and synthetic clays. When the water-insoluble adsorbent is diatomaceous earth, the diatomaceous earth employed in mixtures of this invention is typically activated DE in the form of a substantially dry, white powder prior to coming into contact with the other components of the mixture. Typically, the surface area of the water-insoluble adsorbent is about 1 $m^2/g$ to about 100 $m^2/g$.

Preferred water-insoluble adsorbents include activated carbon, silica particulate, precipitated silica, zeolite, ground walnut shells, fuller's earth, and organic synthetic high molecular weight water-insoluble adsorbents such as polystyrene-divinylbenzene beads, and the like. Another preferred water-insoluble adsorbent is diatomaceous earth.

The proportion of water-insoluble adsorbent to treatment agent will of course depend upon the agent(s) selected and the mixture performance desired for given geological formation and drilling circumstances. Generally speaking, the weight ratio of water-insoluble adsorbent to treatment agent will be in the range of about 95:5 to about 70:30, but can vary within or outside of this range for a given application and formation.

Other components of the mixture, besides the water-insoluble adsorbent and the treatment agent(s), may include, for example, the proppant (e.g., sand), cross linked borate esters, cross-linked polysaccharides, polymeric carbohydrates and the like, as well as mixtures thereof.

In the practice of this invention, the injection of an initial charge of the mixture into the well bore can be carried out in any conventional method of injecting fluids into a well bore of an oil or gas well, whether for fracturing or for gravel packing. Such convention methods include truck treating, continuous injection, or high pressure pumping, for example. The downhole matrix formed within the formation after the initial charge of the mixture is comprised of the active ingredient on a water-insoluble adsorbent as part of the sand matrix.

For gravel packing in a sand control method, the mixture is placed adjacent to a subterranean formation to form a fluid-permeable matrix capable of reducing or substantially preventing the passage of formation particles from the subterranean formation into the well bore while at the same time allowing passage of formation fluids from the subterranean formation into the well bore.

When a screening device is employed, the screening device is placed in a well bore formed in a subterraneous formation before the injection of the mixture. The mixture is injected such that it is packed around the exterior of the screening device to provide a fluid-permeable matrix around the screening device which is capable of reducing or substantially preventing the passage of formation particles from the subterranean formation into the well bore while at the same time allowing passage of formation fluids from the subterranean formation into the well bore. In addition, the screen itself can be packed with the water-insoluble adsorbent containing the well treatment agent. Various known screening devices may be used in accordance with the invention, with particularly suitable examples being that described in, e.g., Harrison et al. in "Comparative Study of Prepacked Screens" SPE 20027, April 1990, the disclosure of which is incorporated herein by reference, as well as the screen which is commercially available under the SLIMFLO brand from BJ Services Company of Houston, Tex.

The step of injecting a solution comprised of an additional amount of the well treatment agent into the formation can be conducted anytime after the initial charge of mixture containing the well treatment agent has been substantially depleted (i.e., has played out) so that the treatment agent performance level has become unacceptable. The injection may be carried out in the same manner by which the initial water-insoluble adsorbent-containing mixture was charged into the well bore, and can be carried out in any conventional method of injecting fluids into a well bore of an oil or gas well, as mentioned above. The solution which is injected will typically be comprised of the desired well treatment agent(s) in a solution which further comprises a solvent. The relative amounts of the solvent and treatment agent of the solution to be injected into the well bore will of course vary depending upon the agent and solvent involved, but will typically be of a solvent to treatment agent ratio in the range of about 10:90 to about 95:5, by weight. The solvent in one embodiment is xylene, toluene, or a heavy aromatic distillate and possible mixtures of all three. When a mixture of all three is considered for such embodiment, the relative amounts of each solvent component can vary, but will be typically in variable weight ratios (xylene:toluene:heavy aromatic distillate) such as 10:70:20, 20:70:10, 70:20:10 or 20:10:70. In another embodiment, the solvent can be water (for water soluble well treatment agents).

After the injection step is carried out, the well bore is pressurized for a time and under conditions sufficient to reactivate the downhole matrix in the formation. This pressurization of material in the well bore and formation fracture is commonly referred to as a "squeeze." Reactivation of the treatment agents downhole has occurred through the squeeze process as long as the treatment agent activity of the in-place matrix is increased relative to the treatment agent activity of the matrix just prior to injecting the solution. The determination of whether the treatment agent activity has increased relative to the activity of that agent just prior to injection of the solution and completion of the squeeze is made through conventional residual analysis and comparison of the same before and after the squeeze, and conventional analysis of the physical well parameters, e.g., the production rate of the well and well pressure.

The pressure to which the well bore is pressurized in the squeeze process typically will be a pressure below the fracturing pressure, and when applicable, below the pressure that would cause the gravel pack to break up. In one embodiment of the invention, the pressure is in a range of about 500 to about 15000 psia. The duration for which the pressure condition is applied to the well will vary, depending upon the ease of fracturing, but will typically be in the range of about 2 to about 10 hours.

The following examples are presented for purposes of illustration, and are not intended to impose limitations on the scope of this invention.

A suitable process for conducting an experimental squeeze will now be described. Place into a column of Ottawa sand (no. 20/40 grit size) an amount of activated DE (untreated) in the range of about 1 to about 2 wt %, based upon the total sand weight. To this column a brine solution is added to simulate well conditions. The column with brine solution is then charged with a white oil (with no additives) under pressure in the range of about 2000 to 3000 psi, fed from an oil reservoir. This provided the baseline standard run without any active well treatment agent added to the DE.

EXAMPLE 1

PARASORB 5000 (paraffin inhibitor) Fracture Life
@ 2% Loading in Ottawa 20/40 Sand Packed column studies were conducted on a paraffin inhibitor (PARASORB 5000 proppant commercially available from BJ Services Company and previously branded or referred to as PARASORB 1), using UNION 76 white oil. The column was packed with 2% PARASORB 5000 proppant and 98% Ottawa 20/40 sand. Elution of a Miocene brine prior to white oil elution was conducted to water wet the matrix and elution of the white oil followed. A pressure capable column was fitted with heat tape and a temperature controller, and the white oil was pumped at 2,000 to 2,500 psi. The volume of effluent was measured, and periodic samples were taken to determine if the PARAS ORB 5000 product was still effective as a pour point depressant. Oil, known to react favorably to the active pour depressant in the PARASORB 5000, was used to measure pour point depressant effectiveness of each of the effluent fractions. The first part of the test consisted of squeezing (e.g., the active pour depressant at 5% active in Kerosene was introduced from the well side of the tubing onto the column) on a conditioned sand column, and passing several thousand pore volumes of oil through it. Periodic samples were taken during the elution period.

The second part of the test consisted of re-packing the column with 2% diatomaceous earth (e.g., the solid support for the active pour point depressant in PARASORB 5000) and squeezing the active ingredient onto the column as a liquid, and measuring the before and after concentration of the paraffin inhibitor by pour point reduction analysis against a standard curve on a treated oil sample at the different concentrations. After this, the white oil is again pumped through the column and periodic samples are tested for pour point reduction.

The results of this testing showed that the native Ottawa sand retained the pour point depressant for the first few pour volumes but dropped off to nearly nothing after the first sample (e.g., no pour point depression) was obtained. In stark contrast, the second part of the test (e.g., where the diatomaceous earth was present on the column) gave active levels of pour point depressant for over 10,000 pore volumes. This means that under moderate production conditions (say 50 Bbl/day) this reactivated fracture job could last nearly 7 years.

The PARASORB 5000 gave a surprisingly long period of effectiveness for an organic paraffin treatment, and gave no appearance of declining after several thousand pore-volumes of white oil exposure.

EXAMPLE 2

SALTSORB 7020 Fracture Life @ 2% Loading in Ottawa 20/40 Sand

Packed column studies were conducted on a proppant containing sodium chloride inhibitor (sold under the brand name SALTROL 7017 and commercially available from BJ Services Company; the formed proppant being commercially available from BJ Services Company under the brand name SALSORB 7020) using saturated salt-water brine. The column was packed with 2% SALTSORB 7020 proppant and 98% Ottawa 20/40 sand. A pressure capable column was fitted with heat tape and a temperature controller, and the saturated sodium chloride brine was pumped at 2,000 to 2,500 psi and 185° F. The volume of effluent was measured, and periodic samples were taken to determine if the SALTSORB 7020 product was still effective as sodium chloride scale inhibitor. Samples were set aside and observed for the formation of salt crystals after various numbers of pore volumes had passed through the column. The first part of the test consisted of squeezing (e.g., the active component, SALTROL 7017 was introduced from the well side of the tubing onto the column) on a conditioned sand column, and passing several thousand pore-volumes of saturated salt water through it. The second part of the test consisted of re-packing the column with 2% diatomaceous earth (e.g., the solid support for the active pour point depressant in SALTSORB 7020) and squeezing the active ingredient onto the column. After this the saturated sodium chloride brine is again pumped through the column and periodic samples are tested for salt crystal inhibition. The results of this testing showed that the native Ottawa sand retained the salt crystal inhibitor for the first few pour volumes but dropped off to nearly nothing after the first eluent fraction was obtained. The same was true of the sample squeezed on diatomaceous earth in the fracturing sand. This was due to the fact that there was no difference in the non-absorbed SALTROL 7017 versus the SALTROL absorbed on effluent samples (e.g., each gave salt crystals on standing).

The SALTSORB 7020 gave a surprisingly short period of effectiveness for a sodium chloride treatment. This is probably because the SALTROL 7017 is extremely soluble in the brine water at elevated temperatures (e.g., 185° F.), and is completely removed after only a few pore volumes of brine eluent passes.

EXAMPLE 3

SCALESORB 3 Fracture Life @ 2% Loading in Ottawa 20/40 Sand

Packed column studies were conducted on a proppant containing scale inhibitor (sold under the brand SCALTROL and commercially available from BJ Services Company, Houston, Tex., the formed proppant being commercial available from the same company under the brand SCALESORB 3) using clean de-ionized water. The column was packed with 2% SCALESORB 3 proppant and 98% Ottawa 20/40 sand. A pressure capable column was fitted with heat tape and a temperature controller, and the de-ionized water was pumped at 2,000 to 2,500 psi and 185° F. The volume of effluent was measured, and periodic samples were taken to determine if the SCALTROL product was still effective as scale inhibitor by conducting spectroscopic measurements of phosphate. Samples were submitted to analytical testing for the presence of phosphates after various numbers of pore volumes had passed through the column. The first part of the test consisted of squeezing (e.g., the active component of SCALESORB 3 was introduced from the well side of the tubing onto the column) on a conditioned sand column, and passing several thousand pore-volumes of de-ionized water through it. The second part of the test consisted of re-packing the column with 2% diatomaceous earth (e.g., the solid support for the active scale inhibitor SCALESORB 3) and squeezing the active ingredient onto the column. After this the de-ionized water is again pumped through the column and periodic samples are tested for phosphorous. The results of this testing showed that the native Ottawa sand retained the scale inhibitor for the first few pour volumes but dropped off to nearly nothing after the first eluent fraction was obtained. The same was true of the sample squeezed on diatomaceous earth in the fracturing sand. This was due to the fact that there was no difference in the non-absorbed scale inhibitor versus the scale inhibitor absorbed on effluent samples.

The non adsorbed scale inhibitor gave a surprisingly short period of effectiveness as the phosphorous content showed. Without being bound to theory, it is believed that, because the scale inhibitor is extremely soluble in the de-ionized water at elevated temperatures (e.g., 185° F.), it is completely removed after only a few pore volumes of de-ionized eluent passes.

Additional embodiments of the invention are as follows:
A) A process which comprises:
injecting an initial charge of a mixture, the mixture being formed from at least a water-insoluble adsorbent and at least one well treatment agent, into a well bore formed in a subterraneous formation;
placing the mixture adjacent to the subterranean formation to form a fluid-permeable matrix that is capable of reducing or substantially preventing the passage of formation particles from the subterranean formation into the well bore while at the same time allowing passage of formation fluids from the subterranean formation into the well bore; and then
pressurizing the well bore for a time and under conditions sufficient to reactivate the matrix in the formation, so that the treatment agent activity of the matrix is increased relative to the treatment agent activity of the matrix just prior to injecting the solution, wherein the water-insoluble adsorbent is diatomaceous earth, activated carbon, silica particulate, precipitated silica, zeolite, ground walnut shells, fuller's earth, or an organic synthetic high molecular weight water-insoluble adsorbent, wherein the process has at least one of the following features:
(i) the well treatment agent is selected from the group consisting of a paraffin inhibitor, a salt inhibitor, a scale inhibitor, an asphaltene inhibitor and a mixture of two or more of the foregoing;
(ii) the well bore is pressurized to a pressure below the pressure which causes the matrix to break up.
B) The process of A), wherein the well treatment agent is a paraffin inhibitor comprised of a paraffin crystal modifier, which paraffin crystal modifier is comprised of an ethylene vinyl acetate polymer.
C) The process of A), wherein the pressure is in a range of about 250 to about 15000 psia.
D) The process of C), wherein the pressure is in a range of about 500 to about 15000 psia.
E) A process which comprises:
placing a screening device in a well bore formed in a subterraneous formation;
injecting an initial charge of a mixture, the mixture being formed from at least a water-insoluble adsorbent and at least one well treatment agent, into the well bore, wherein the mixture is injected into the well bore such that the mixture is packed around the exterior of the screening device to provide a fluid-permeable matrix around the screening device which is capable of reducing or substantially preventing the passage of formation particles from the subterranean formation into the well bore while at the same time allowing passage of formation fluids from the subterranean formation into the well bore; and then
pressurizing the well bore for a time and under conditions sufficient to reactivate the matrix in the formation, so that the treatment agent activity of the matrix is increased relative to the treatment agent activity of the matrix just prior to injecting the solution, wherein the process has at least one of the following features:
(i) the well treatment agent is selected from the group consisting of a paraffin inhibitor, a salt inhibitor, a scale inhibitor, an asphaltene inhibitor and a mixture of two or more of the foregoing;
(ii) the well bore is pressurized to a pressure below the pressure which causes the matrix to break up.
F) The process of E), wherein the process has features (i) and (ii), wherein the well treatment agent is a paraffin inhibitor comprised of a paraffin crystal modifier, which paraffin crystal modifier is comprised of an ethylene vinyl acetate polymer, and wherein the pressure is in a range of about 500 to about 15000 psia.
G) The process of E), wherein the well treatment agent is a paraffin inhibitor comprised of a paraffin crystal modifier, which paraffin crystal modifier is comprised of an ethylene vinyl acetate polymer.
H) The process of E), wherein the pressure is in a range of about 250 to about 15000 psia.
I) The process of H), wherein the pressure is in a range of about 500 to about 15000 psia.
J) A process as in any of E) to I) wherein the water-insoluble adsorbent is diatomaceous earth, activated carbon, silica particulate, precipitated silica, zeolite, ground walnut shells, fuller's earth, or an organic synthetic high molecular weight water-insoluble adsorbent
K) A process as in J) wherein the water-insoluble adsorbent is diatomaceous earth.

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore, the foregoing description is not intended to limit, and should not be construed as limiting, the invention to the particular exemplifications presented hereinabove.

That which is claimed is:
1. A process comprising
injecting an initial charge of a mixture, the mixture being formed from at least a water-insoluble adsorbent and at least one well treatment agent, into a well bore formed in a subterraneous formation so as to form a downhole matrix within the formation;

injecting a solution comprised of an additional amount of the well treatment agent into the formation after the initial charge of the at least one well treatment agent has been substantially depleted; and then pressurizing the well bore for a time and under conditions sufficient to reactivate the down-hole matrix in the formation, so that the treatment agent activity of the matrix is increased relative to the treatment agent activity of the matrix just prior to injecting the solution.

2. A process as in claim 1 wherein the water-insoluble adsorbent is activated carbon, silica particulate, precipitated silica, zeolite, ground walnut shells, fuller's earth, or an organic synthetic high molecular weight water-insoluble adsorbent.

3. The process of claim 2, wherein the process has at least one of the following features:
    (i) the well treatment agent is selected from the group consisting of a paraffin inhibitor, a salt inhibitor, a scale inhibitor, an asphaltene inhibitor and a mixture of two or more of the foregoing;
    (ii) the well bore is pressurized to a pressure below the fracturing pressure.

4. The process of claim 3, wherein the well treatment agent is a paraffin inhibitor comprised of a paraffin crystal modifier.

5. The process of claim 4, wherein the paraffin crystal modifier is comprised of an ethylene vinyl acetate polymer.

6. The process of claim 3, wherein the pressure is in a range of about 250 to about 15000 psia.

7. The process of claim 6, wherein the pressure is in a range of about 500 to about 15000 psia.

8. The process of claim 3, wherein the process has features (i) and (ii), wherein the well treatment agent is a paraffin inhibitor comprised of a paraffin crystal modifier, and wherein the pressure is in a range of about 250 to about 15000 psia.

9. The process of claim 8, wherein the paraffin crystal modifier is comprised of an ethylene vinyl acetate polymer.

10. A process which comprises:
    injecting an initial charge of a mixture, the mixture being formed from at least a water-insoluble adsorbent and at least one well treatment agent, into a well bore formed in a subterraneous formation;
    placing the mixture adjacent to the subterranean formation to form a fluid-permeable matrix that is capable of reducing or substantially preventing the passage of formation particles from the subterranean formation into the well bore while at the same time allowing passage of formation fluids from the subterranean formation into the well bore; and then
    pressurizing the well bore for a time and under conditions sufficient to reactivate the matrix in the formation, so that the treatment agent activity of the matrix is increased relative to the treatment agent activity of the matrix just prior to injecting the mixture.

11. A process as in claim 10 wherein the water-insoluble adsorbent is diatomaceous earth, activated carbon, silica particulate, precipitated silica, zeolite, ground walnut shells, fuller's earth, or an organic synthetic high molecular weight water-insoluble adsorbent.

12. The process of claim 10, wherein the process has at least one of the following features:
    (i) the well treatment agent is selected from the group consisting of a paraffin inhibitor, a salt inhibitor, a scale inhibitor, an asphaltene inhibitor and a mixture of two or more of the foregoing;
    (ii) the well bore is pressurized to a pressure below the pressure which causes the matrix to break up.

13. The process of claim 12, wherein the well treatment agent is a paraffin inhibitor comprised of a paraffin crystal modifier.

14. The process of claim 12, wherein the process has features (i) and (ii), wherein the well treatment agent is a paraffin inhibitor comprised of a paraffin crystal modifier, and wherein the pressure is in a range of about 250 to about 15000 psia.

15. The process of claim 14, wherein the paraffin crystal modifier is comprised of an ethylene vinyl acetate polymer.

16. A process which comprises:
    placing a screening device in a well bore formed in a subterraneous formation;
    injecting an initial charge of a mixture, the mixture being formed from at least a water-insoluble adsorbent and at least one well treatment agent, into the well bore, wherein the mixture is injected into the well bore such that the mixture is packed around the exterior of the screening device to provide a fluid-permeable matrix around the screening device which is capable of reducing or substantially preventing the passage of formation particles from the subterranean formation into the well bore while at the same time allowing passage of formation fluids from the subterranean formation into the well bore; and then
    pressurizing the well bore for a time and under conditions sufficient to reactivate the matrix in the formation, so that the treatment agent activity of the matrix is increased relative to the treatment agent activity of the matrix just prior to injecting the mixture.

17. A process as in claim 16 wherein the water-insoluble adsorbent is diatomaceous earth, activated carbon, silica particulate, precipitated silica, zeolite, ground walnut shells, fuller's earth, or an organic synthetic high molecular weight water-insoluble adsorbent.

18. The process of claim 16, wherein the process has at least one of the following features:
    (i) the well treatment agent is selected from the group consisting of a paraffin inhibitor, a salt inhibitor, a scale inhibitor, an asphaltene inhibitor and a mixture of two or more of the foregoing;
    (ii) the well bore is pressurized to a pressure below the pressure which causes the matrix to break up.

19. The process of claim 18, wherein the well treatment agent is a paraffin inhibitor comprised of a paraffin crystal modifier.

20. The process of claim 18, wherein the process has features (i) and (ii), wherein the well treatment agent is a paraffin inhibitor comprised of a paraffin crystal modifier, and wherein the pressure is in a range of about 250 to about 15000 psia.

* * * * *